United States Patent
Katsumata et al.

(10) Patent No.: US 9,726,055 B2
(45) Date of Patent: Aug. 8, 2017

(54) POPPET VALVE

(71) Applicants: Shouji Katsumata, Gotemba (JP); Kenichi Harada, Susono (JP); Keiju Tomoda, Susono (JP); Toshihisa Sugiyama, Gotemba (JP)

(72) Inventors: Shouji Katsumata, Gotemba (JP); Kenichi Harada, Susono (JP); Keiju Tomoda, Susono (JP); Toshihisa Sugiyama, Gotemba (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 66 days.

(21) Appl. No.: 14/765,026

(22) PCT Filed: Jan. 7, 2014

(86) PCT No.: PCT/JP2014/050076
§ 371 (c)(1),
(2) Date: Jul. 31, 2015

(87) PCT Pub. No.: WO2014/125843
PCT Pub. Date: Aug. 21, 2014

(65) Prior Publication Data
US 2015/0369091 A1    Dec. 24, 2015

(30) Foreign Application Priority Data

Feb. 15, 2013    (JP) .................................. 2013-027987

(51) Int. Cl.
*F01L 3/12* (2006.01)
*F16K 49/00* (2006.01)
(Continued)

(52) U.S. Cl.
CPC ........ *F01L 3/12* (2013.01); *F01L 3/06* (2013.01); *F16K 1/36* (2013.01); *F16K 49/00* (2013.01); *Y02T 10/146* (2013.01)

(58) Field of Classification Search
CPC ......... F01L 3/08; F01L 2820/045; F01L 3/02; F01L 3/04; F01L 3/22; F01L 7/08; F01L 7/10
See application file for complete search history.

(56) References Cited

U.S. PATENT DOCUMENTS 3,426,741 A * 2/1969 Haagen ..................... F01L 3/02
                                              123/188.9
3,599,619 A    8/1971 Kuhn
(Continued)

FOREIGN PATENT DOCUMENTS

| JP | 54-172112 U | 12/1979 |
| JP | 5649212 U1 | 5/1981 |
| JP | 2004-512455 A | 4/2004 |

OTHER PUBLICATIONS

International Search Report for PCT/JP2014/050076 dated Mar. 11, 2014.

*Primary Examiner* — Hai Huynh
*Assistant Examiner* — Long T Tran
(74) *Attorney, Agent, or Firm* — Sughrue Mion, PLLC

(57) ABSTRACT

A poppet valve includes a head and a stem, which extends from the head. At least a part of the back of the head is covered by a cover with a heat insulating space provided in between. A support portion is provided between the cover and the head to support the cover on the head with rubber member having a lower heat conductivity than that of the head between the cover and the head.

13 Claims, 9 Drawing Sheets

(51) Int. Cl.
 *F01L 3/06* (2006.01)
 *F16K 1/36* (2006.01)

(56) References Cited

U.S. PATENT DOCUMENTS

| | | | | |
|---|---|---|---|---|
| 4,300,492 A | | 11/1981 | Bart | |
| 4,346,870 A | * | 8/1982 | Chute | F01L 3/02 123/188.3 |
| 4,351,291 A | * | 9/1982 | Mahaney | F23Q 7/001 123/145 A |
| 4,351,292 A | * | 9/1982 | Worthen | F01L 3/04 123/188.2 |
| 4,881,500 A | * | 11/1989 | Kojima | F01L 3/20 123/188.3 |
| 2002/0100448 A1 | | 8/2002 | Linke et al. | |

* cited by examiner

Basal End Side

Distal End Side

POPPET VALVE

CROSS REFERENCE TO RELATED APPLICATIONS

This application is a National Stage of International Application No. PCT/JP2014/050076 filed Jan. 7, 2014, claiming priority based on Japanese Patent Application No. 2013-027987, filed Feb. 15, 2013, the contents of all of which are incorporated herein by reference in their entirety.

TECHNICAL FIELD

The present invention relates to a poppet valve for selectively opening and closing an intake port or an exhaust port of an internal combustion engine.

BACKGROUND ART

An internal combustion engine has poppet valves including an intake valve for selectively opening and closing an intake port and an exhaust valve for selectively opening and closing an exhaust port. These valves are heated to a high temperature by heat produced in the combustion chambers. Therefore, if fuel or oil adheres to the valves, volatile elements of the fuel or oil vaporize and thus form a deposit. The deposit may accumulate on the heads of poppet valves, thus decreasing the amount of intake air flowing into the combustion chambers or increasing the flow resistance of the exhaust air flowing out from the combustion chamber. To avoid these problems, a poppet valve described in Patent Document 1 restrains adhesion of fuel or oil on a back of a head by employing a cover for covering the back. Also, a heat insulating space is provided between the cover and the poppet valve to decrease the amount of the heat transferred from the poppet valve to the cover, thus restraining a temperature rise in the cover. As a result, deposit accumulation on the cover is restrained.

PRIOR ART DOCUMENTS

Patent Documents

Patent Document 1: Japanese National Phase Laid-Open Patent Publication No. 2004-512455

SUMMARY OF THE INVENTION

Problems that the Invention is to Solve

In the poppet valve described in Patent Document 1, the cover is supported by a support portion on the head. However, heat is thus transferred from the head to the cover through the support portion, which is held in contact with the head. As a result, temperature rise in the cover cannot be sufficiently restrained.

Accordingly, it is an objective of the present invention to provide a poppet valve capable of decreasing the amount of deposit accumulated on a cover by effectively restraining a temperature rise in the cover.

Means for Solving the Problems

To achieve the foregoing objective, a poppet valve having a basal end and a distal end is provided. The poppet valve includes a head arranged at the distal end and having a back, a stem extending from the head toward the basal end, a cover adapted for covering at least a portion of the back with a heat insulating space in between, and a support portion arranged between the cover and the head. The support portion supports the cover on the head via a heat insulating member having a heat conductivity lower than a heat conductivity of the head.

In this configuration, the cover is supported via a member having lower heat conductivity than that of the head. This decreases the amount of the heat transferred from the head to the cover, thus effectively restraining a temperature rise in the cover. As a result, vaporization of volatile elements of fuel or oil adhering to the surface of the cover is restrained and the amount of deposit accumulated on the cover is decreased.

To achieve the foregoing objective, anther poppet valve is provided that includes a valve body, a cover, and a support portion. The valve body has a basal end and a distal end. The valve body includes a head arranged at the distal end and having a back and a stem extending from the head toward the basal end. The cover is adapted for covering at least a portion of a range including the back and the stem with a heat insulating space in between. The support portion is arranged between the cover and the valve body. The support portion supports the cover via a heat insulating member having a heat conductivity lower than a heat conductivity of the valve body.

In this configuration, the cover is supported via a member having lower heat conductivity than that of the valve body. This decreases the amount of the heat transferred from the valve body to the cover, thus effectively restraining a temperature rise in the cover. As a result, vaporization of volatile elements of the fuel or oil adhering to the surface of the cover is restrained and the amount of deposit accumulated on the cover is decreased.

The heat insulating member is preferably formed of a material different from a material of the cover. In this case, an interface is formed by different types of materials in the joined portion between the heat insulating member and the cover. This decreases the amount of the heat transferred to the cover through the interface, thus restraining a temperature rise in the cover further effectively.

Also, by arranging the support portions at the opposite end portions of the cover, which are located comparatively close to the basal end and the distal end of the poppet valve (or the valve body), the cover is attached to the poppet valve with improved stability.

In a case in which the support portion is one of a plurality of support portions that are located at the end portion of the cover comparatively close to the distal end, the support portions are preferably spaced apart in a circumferential direction of the head.

In this configuration, fuel or oil introduced into the heat insulating space is discharged to the exterior through between each circumferentially adjacent pair of the support portions at the end portion of the cover located comparatively close to the distal end of the poppet valve (or the valve body). This restrains accumulation of fuel or oil in the heat insulating space and resulting deposit formation.

In the case of the support portion located at the end portion of the cover comparatively close to the basal end, arranging the support portion over the entire circumference of the head or the stem restrains introduction of fuel or oil into the heat insulating space via, for example, the surface of the stem. This restrains accumulation of the fuel or oil in the heat insulating space and resulting deposit formation.

To achieve the foregoing objective, another poppet valve having a basal end and a distal end is provided. The poppet valve includes a head arranged at the distal end and having a back, a stem extending from the head toward the basal end, a cover, and a support portion. The cover is adapted for covering the back and the stem with a heat insulating space in between. A portion of the cover comparatively close to the basal end is fixed directly to the stem. The support portion is arranged at a portion of the cover comparatively close to the distal end. The support portion supports the cover on the head via a heat insulating member having a heat conductivity lower than a heat conductivity of the head.

In this configuration, the cover is supported via a member having lower heat conductivity than that of the head. This decreases the amount of the heat transferred from the head to the cover, thus effectively restraining a temperature rise in the cover. Also, the portion of the cover located comparatively close to the basal end of the poppet valve is fixed directly to the stem through, for example, swaging or welding. The cover is thus supported stably on the poppet valve. As a result, vaporization of volatile elements of the fuel or oil adhering to the surface of the cover is restrained and the amount of deposit accumulated on the cover is decreased.

In this poppet valve, the support portion is preferably one of a plurality of support portions that are arranged to be spaced apart in a circumferential direction of the head.

In this configuration, the fuel or oil introduced into the heat insulating space is discharged to the exterior through between each circumferentially adjacent pair of the support portions at the end portion of the cover located comparatively close to the distal end of the poppet valve. This restrains accumulation of the fuel or oil in the heat insulating space and resulting deposit formation.

In this poppet valve, the portion of the cover comparatively close to the basal end is preferably fixed to the stem while being held in contact with the stem over the entire circumference of the stem.

In this configuration, introduction of fuel or oil into the heat insulating space via the surface of the stem is restrained. This restrains accumulation of fuel or oil in the heat insulating space and resulting deposit formation.

The support portion preferably includes a protrusion that protrudes either from one of the head and the stem to the cover or from the cover to one of the head and the stem. The support portion also preferably includes a recess that is formed either in one of the head and the stem or in the cover in which the protrusion is not formed, and the protrusion and the recess are preferably engaged with each other.

In this configuration, by engaging a protrusion arranged either on one of the head and the stem or on the cover with a recess formed either in one of the head and the stem or in the cover in which the protrusion is not formed, the cover is attached to the back at a desired position. This facilitates attachment of the cover and the poppet valve.

In a case in which the poppet valve is an intake valve, the heat insulating member preferably includes a covered portion covered by the cover and an exposed portion exposed from the cover.

In this configuration, when intake air flows into a combustion chamber in an intake stroke, the exposed portion is exposed to the intake air and thus cooled. This restrains a temperature rise in the heat insulating member and improves durability of the heat insulating member.

Also, by arranging the surface of the cover and the surface of the exposed portion to be flush with each other, separation of the intake air flowing along the surface of the cover from a connecting portion between the surface of the cover and the surface of the exposed portion is restrained. This decreases flow resistance of the intake air passing the periphery of the intake valve and flowing into a combustion chamber, thus restraining decrease of intake efficiency caused by the cover.

The support portion is preferably located at the end portion of the cover comparatively close to the distal end, and a surface of the exposed portion and a valve seat contact surface of the head are preferably flush with each other.

This configuration restrains separation of the intake air flowing along the surface of the exposed portion from a connecting portion between the surface of the exposed portion and the valve seat contact surface of the head. This decreases flow resistance of the intake air passing the periphery of the intake valve and flowing into the combustion chambers, thus restraining decrease of intake efficiency caused by the cover. In this configuration, it is preferable that the surface of the cover and the surface of the exposed portion be flush with each other. The configuration ensures that the intake air flows smoothly on the surface of the cover, the surface of the exposed portion, and the valve seat contact surface. The flow direction of the intake air is thus not changed abruptly. As a result, the flow resistance of the intake air passing the periphery of the intake valve and flowing into a combustion chamber is decreased and decrease of intake efficiency caused by the cover is further restrained.

Also, by forming the heat insulating member of the support portion using elastic material, transmission of the impact caused by the poppet valve when the poppet valve is seated on the cylinder head to the cover through the support portion is restrained. Also, even if the cover or the poppet valve has a shape error, the heat insulating member is elastically deformed to absorb the shape error, thus ensuring stable attachment of the cover and the poppet valve.

Further, even if the heat insulating member is formed of a material that does not easily flex, the same advantages as the advantages of the heat insulating member formed of an elastic material are obtained as long as the heat insulating member is formed in an elastically deformable shape.

For example, the heat insulating member may have an annular shape extending in a circumferential direction of the stem, and a cross section of the heat insulating member in the circumferential direction may have a wavy shape. In this case, the heat insulating member is clamped by the end portion of the cover comparatively close to the distal end and the back.

This configuration increases the amount of elastic deformation of the heat insulating member when the heat insulating member is pressed in the up-down direction of the wavy shape. As a result, even if the cover or the poppet valve has a shape error, the heat insulating member is elastically deformed to absorb the shape error, thus ensuring stable attachment of the cover and the poppet valve.

A part of the heat insulating member is preferably discontinuous in the circumferential direction.

This configuration further increases the amount of elastic deformation of the heat insulating member by enlarging the gap at the discontinuous portion of the heat insulating member. As a result, even if the cover or the poppet valve has a great shape error, stable attachment of the cover and the poppet valve is ensured.

In the above described poppet valve, the heat insulating member may be formed of a porous material. In this case, the heat insulating member preferably has an inner portion close to the heat insulating space and an outer portion located on a side opposite to the inner portion, and the outer portion preferably has a porosity lower than the porosity of the inner portion.

If the heat insulating member is formed of porous material, heat insulating performance of the heat insulating member is improved by increasing the porosity. However, the increased porosity promotes introduction of fuel or oil into the interior of the heat insulating member. Such introduction of fuel or oil into the interior of the heat insulating member can decrease heat insulating performance of the heat insulating member.

In the above-described configuration, the heat insulating member is formed of porous material and the porosity of the outer portion is set lower than the porosity of the inner portion close to the heat insulating space. That is, the porosity of the outer portion, which promotes adhesion of the fuel or oil, is set relatively low such that the outer portion is formed with comparatively high density. This hampers introduction of fuel or oil into the interior of the heat insulating member, thus restraining decrease of the heat insulating performance caused by such introduction of fuel or oil.

MODES FOR CARRYING OUT THE INVENTION

First Embodiment

A poppet valve according to a first embodiment will now be described with reference to FIGS. 1 to 3. The poppet valve is an intake valve of an internal combustion engine.

Figure 1:
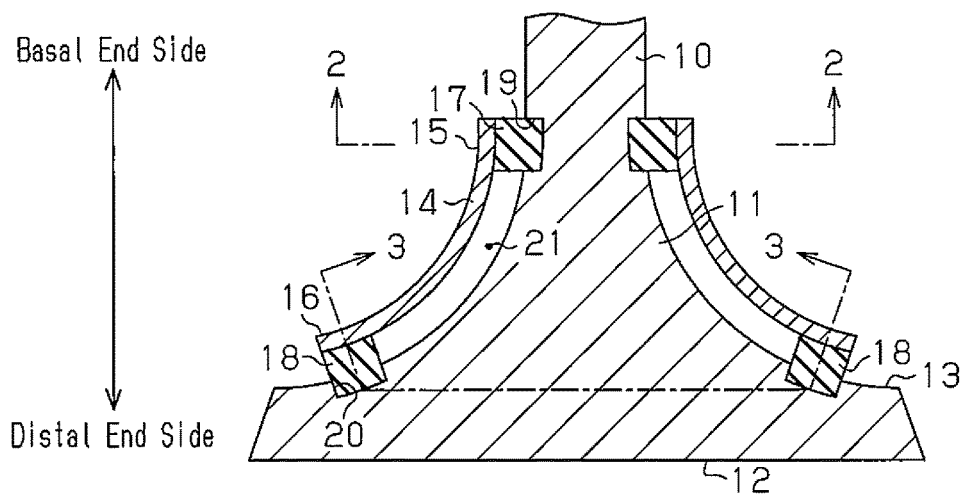
FIG. 1 is a cross-sectional view showing a poppet valve.

As shown in FIG. 1, an intake valve includes a valve body having a stem 10 and a head 11, which is connected to the lower end of the stem 10. The lateral cross section of the head 11, which extends perpendicular to the axial direction of the stem 10, has a substantially circular shape. The diameter of the head 11 becomes greater in a direction toward a head surface 12. The intake valve (the valve body) is formed of, for example, iron steel. Hereinafter, the end portion of the intake valve (the valve body) in which the head 11 is arranged will be referred to as the distal end. The end portion of the intake valve (the valve body) opposite to the distal end will be referred to as the basal end. The stem 10 extends from the head 11, which is arranged at the distal end of the intake valve (the valve body), toward the basal end of the intake valve (the valve body).

The intake valve has a substantially cylindrical cover 14, which covers a back 13 of the head 11. The cover 14 is formed of, for example, aluminum and has a diameter becoming greater in the direction toward the distal end in correspondence with the shape of the back 13.

The cover 14 has an upper end portion 15, which is located comparatively close to the basal end of the intake valve (the valve body), and a lower end portion 16, which is located comparatively close to the distal end of the intake valve (the valve body). Rubber members 17, 18 are fixed to the inner peripheral surfaces of the upper and lower end portions 15, 16 through, for example, vulcanized bonding. More specifically, the rubber member 17, which has an annular shape extending over the entire circumference of the inner peripheral surface of the upper end portion 15 of the cover 14, is bonded to the upper end portion 15. The rubber members 18 are bonded to the lower end portion 16 of the cover 14 and are spaced apart at predetermined intervals in the circumferential direction of the inner peripheral surface of the lower end portion 16. The rubber members 17, 18 are heat-resistant and have heat conductivity lower than the heat conductivity of the valve body, or, in other words, each of the heat conductivities of the stem 10 and the head 11.

A portion of the stem 10 facing the upper end portion 15 of the cover 14 has a groove 19, which is an annular recess extending over the entire circumference of this portion. A portion of the head 11 facing the lower end portion 16 of the cover 14 has a plurality of recesses 20, which are spaced apart at predetermined intervals in the circumferential direction of this portion. The rubber member 17 and the rubber members 18 are fitted in the groove 19 and the recesses 20, respectively, to support the cover 14 on the stem 10 and the head 11, respectively, while being spaced from the back 13 by a predetermined distance. That is, the rubber members 18 and the recesses 20 function as support portions for supporting the cover 14 on the head 11 (the valve body). The rubber member 17 and the groove 19 function as support portions for supporting the cover 14 on the stem 10 (the valve body). Such arrangement provides a heat insulating space 21 between the cover 14 and the back 13.

Figure 2:
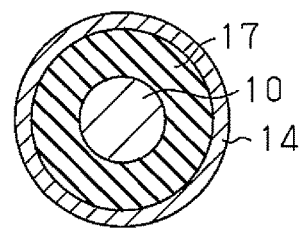
FIG. 2 is a cross-sectional view taken along line 2-2 of FIG. 1.
Figure 3:
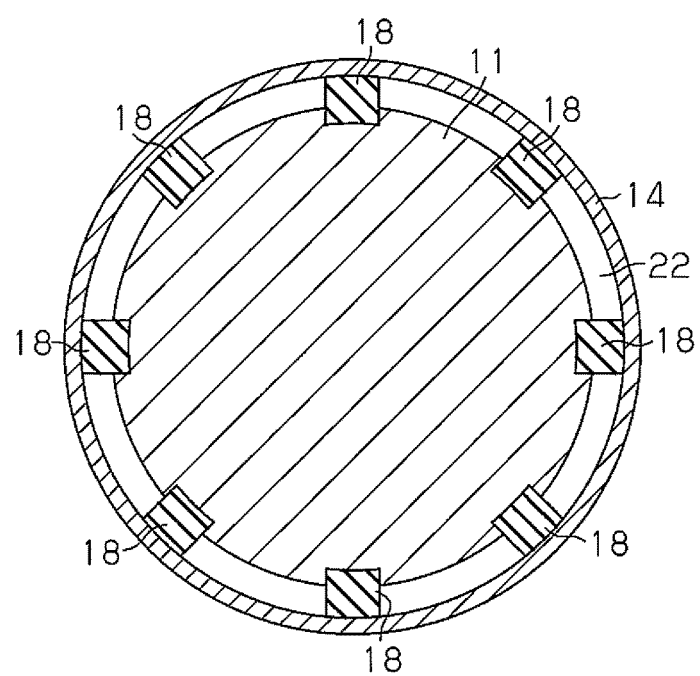
FIG. 3 is a cross-sectional view taken along line 3-3 of FIG. 1.

With reference to FIG. 2, when the cover 14 is attached to the intake valve (the valve body), the upper end of the heat insulating space 21, which is the space between the upper end portion 15 of the cover 14 and the stem 10, is held in a state sealed by the rubber member 17. Referring to FIG. 3, the lower end of the heat insulating space 21, which is the space between the lower end portion 16 of the cover 14 and the head 11, has gaps 22, which are spaced apart circumferentially at predetermined intervals.

Operation of the intake valve having the above described configuration will now be described.

In the intake valve of the first embodiment, the cover 14 is supported by the stem 10 and the head 11 (which are the valve body) via the rubber members 17, 18, each of which has heat conductivity lower than those of the stem 10 and the head 11 (the valve body). This decreases the amount of the heat transferred from the stem 10 and the head 11 to the cover 14.

The first embodiment achieves the following advantages.

(1) The cover 14 is supported via the rubber members 17, 18, each of which has a heat conductivity lower than those of the stem 10 and the head 11. This decreases the amount of the heat transferred from the stem 10 and the head 11 to the cover 14, thus effectively restraining a temperature rise in the cover 14. As a result, vaporization of volatile elements of fuel or oil adhering to the surface of the cover 14 is restrained and the amount of deposit accumulated on the cover 14 is thus decreased.

(2) Since the rubber members 17, 18 are employed as heat insulating members, an interface of different types of materials is formed in a joined portion between each of the rubber members 17, 18 and the cover 14. This decreases the amount of the heat transferred to the cover 14 through the interface. As a result, a temperature rise in the cover 14 is further restrained.

(3) The support portions are arranged at both the upper end portion 15 and the lower end portion 16 of the cover 14. This improves attachment stability of the cover 14 to the valve body.

(4) The support portions located at the lower end portion 16 of the cover 14 are spaced apart in the circumferential direction of the head 11. The fuel or oil introduced into the heat insulating space 21 between the valve body and the cover 14 is thus discharged to the exterior through the gaps 22 between the corresponding adjacent circumferential pairs of the support portions at the lower end portions 16 of the cover 14. This restrains accumulation of fuel or oil in the heat insulating space 21 and resulting deposit formation.

(5) The support portion located at the upper end portion 15 of the cover 14 extends over the entire circumference of the head 11. The space between the upper end portion 15 of the cover 14 and the stem 10 is sealed by the rubber member 17. This restrains introduction of oil or fuel into the heat insulating space 21 via, for example, the surface of the stem 10. Accumulation of oil or fuel in the heat insulating space 21 and resulting deposit formation are thus restrained.

(6) The support portions include the rubber members 17, 18, which are the protrusions bonded to the cover 14 and protruding toward the stem 10 and the head 11, respectively, and the groove 19 and the recesses 20, which are formed in the stem 10 and the head 11, respectively, and engaged with the rubber member 17 and the rubber members 18, respectively. By engaging each of the rubber members 17, 18 with the corresponding one of the groove 19 and the recesses 20, the cover 14 is attached to the back 13 at a desired position. This facilitates attachment of the cover 14 to the valve body.

(7) The rubber members 17, 18, which are made of an elastic material, are used as heat insulating members. This restrains transmission of impact caused by the intake valve when the intake valve becomes seated on the cylinder head to the cover 14 via the support portions. Also, even if the cover 14 or the head 11 or the stem 10 has a shape error, the corresponding one of the rubber members 17, 18 is elastically deformed to absorb the shape error, thus ensuring stable attachment of the components. Further, sealing performance between the cover 14 and the rubber member 17 and between the stem 10 and the rubber member 17, are improved. This further restrains introduction of fuel or oil into the heat insulating space 21 via, for example, the surface of the stem 10. Accumulation of the fuel or oil in the heat insulating space 21 and resulting deposit formation are thus restrained.

Second Embodiment

A poppet valve according to a second embodiment will be described with reference to FIG. 4. Like or the same reference numerals are given to those components that are like or the same as the corresponding components of the first embodiment, and detailed explanations are omitted.

Figure 4:
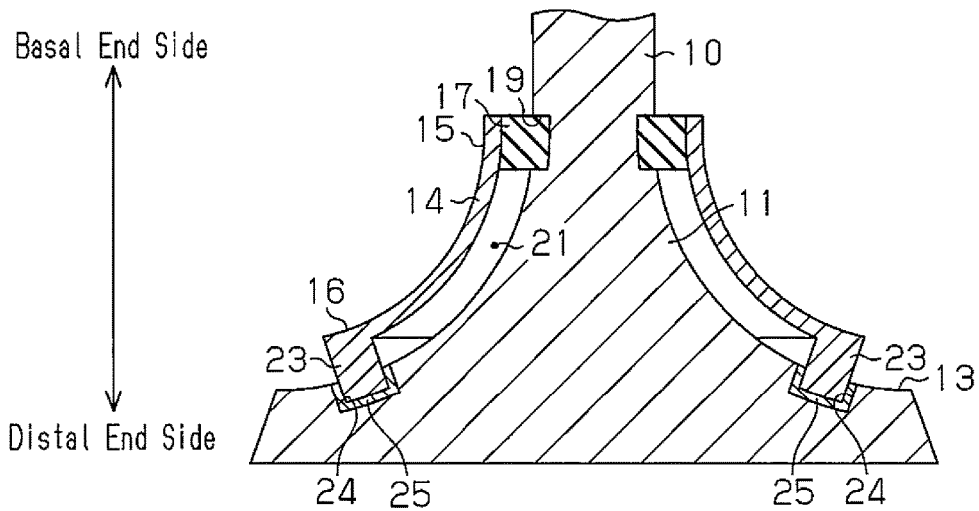
FIG. 4 is a cross-sectional view showing a poppet valve.

As shown in FIG. 4, the heat-resistant rubber member 17, which extends over the entire circumference of the inner peripheral surface of the upper end portion 15, is fixed to the cover 14 of the intake valve through, for example, vulcanized bonding. Also, the lower end portion 16 of the cover 14 has a plurality of projecting portions 23, which are spaced apart at predetermined intervals in the circumferential direction of the lower end portion 16 and projected toward the head 11.

The portion of the stem 10 facing the upper end portion 15 of the cover 14 has the groove 19, which extends over the entire circumference of this portion. The portion of the head 11 facing the projecting portions 23 of the cover 14 has a plurality of recesses 24, which are spaced apart at predetermined intervals in the circumferential direction of this portion. The inner peripheral surface of each of the recesses 24 is coated with a thermal barrier coating (TBC) 25, which has a thermal barrier layer formed of, for example, ceramic. The recesses 24 are engaged with the corresponding projecting portions 23 of the cover 14 to support the lower end portion 16 of the cover 14 on the head 11. That is, each of the projecting portions 23 of the cover 14 is engaged with the corresponding one of the recesses 24 of the head 11 through the associated one of the thermal barrier coatings 25. Further, the rubber member 17 fixed to the cover 14 is engaged with the groove 19 formed in the stem 10 to support the upper end portion 15 of the cover 14 on the stem 10. That is, in the second embodiment, the projecting portions 23, the recesses 24, and the thermal barrier coatings 25 function as supporting portions for supporting the cover 14 on the head 11. The rubber member 17 and the groove 19 function as support portions for supporting the cover 14 on the stem 10.

The second embodiment achieves the same advantages as the first embodiment.

Third Embodiment

A poppet valve according to a third embodiment will now be described with reference to FIG. 5. The third embodiment is different from the first and second embodiments in that, the cover 14 is fixed to the stem 10 by swaging the upper end portion 15 of the cover 14 and in the configuration of a support portion arranged at the lower end portion 16 of the cover 14. Like or the same reference numerals are given to those components that are like or the same as the corresponding components of the above-mentioned embodiments and detailed explanations are omitted.

Figure 5:
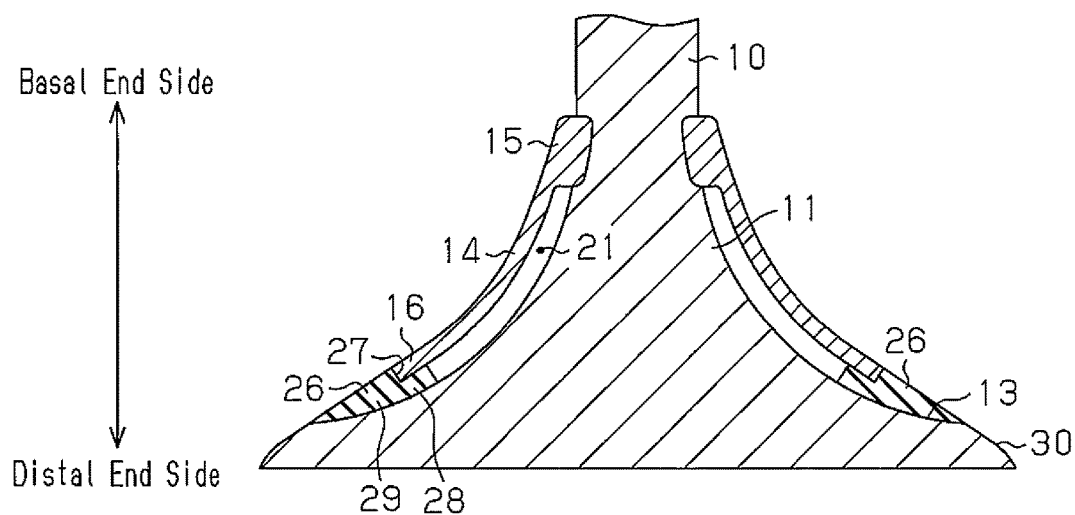
FIG. 5 is a cross-sectional view showing a poppet valve.

With reference to FIG. 5, the cover 14 of the intake valve is fixed directly to the stem 10 with the upper end portion 15 of the cover 14 swaged to the stem 10 and held in contact with the stem 10 over the entire circumference of the stem 10. Heat-resistant rubber members 26 are fixed to the back 13 of the head 11 through, for example, vulcanized bonding and spaced apart at predetermined intervals in the circumferential direction of the back 13. Each of the rubber members 26 has a stepped portion 27 and the lower end portion 16 of the cover 14 abuts against the stepped portion 27. In this state, the cover 14 and the rubber members 26 are bonded together. The lower end portion 16 of the cover 14 is thus supported by the rubber members 26 on the head 11.

Each of the rubber members 26 has a covered portion 28 covered by the cover 14 and an exposed portion 29 exposed from the cover 14. The exposed portion 29 refers to the portion projecting outward from the cover 14 in the extending direction of the cover 14. The height of the stepped portion 27 is substantially equal to the thickness of the cover 14. The surface of the exposed portion 29 of each rubber member 26 and the surface of the cover 14 are flush with each other when the rubber members 26 and the cover 14 are bonded together. Also, the surface of the exposed portion 29 of each rubber member 26 and a valve seat contact surface 30 are flush with each other. The surface of each exposed portion 29, the surface of the cover 14, and the valve seat contact surface 30 are thus located on a common plane.

Operation of the intake valve having the above described configuration will now be described In the intake valve of the third embodiment, each rubber member 26 has the exposed portion 29, which is exposed from the cover 14. Therefore, when intake air flows into the combustion chamber in an intake stroke, the exposed portions 29 are exposed to the intake air and thus the rubber members 26 are cooled.

The surface of the cover 14, the surfaces of the exposed portions 29, and the valve seat contact surface 30 of the head 11 are flush with one another. This restrains separation of the intake air flowing along the surface of the cover 14 from a connecting portion between the surface of the cover 14 and the surface of each exposed portion 29 and separation of the intake air flowing along the surface of the exposed portion 29 from a connecting portion between the surface of the exposed portion 29 and the valve seat contact surface 30 of the head 11. The intake air thus flows smoothly on the surface of the cover 14, the surfaces of the exposed portions 29, and the valve seat contact surface 30. This prevents the flow direction of the intake air from being changed abruptly.

The upper end portion 15 of the cover 14 is swaged to the stem 10 and fixed directly to the stem 10 while being held in contact with the stem 10 over the entire circumference of the stem 10. This restrains introduction of fuel or oil into the heat insulating space 21 via the surface of the stem 10.

The described above third embodiment achieves the following advantages in addition to the advantages (1) to (4) and (7).

(8) The upper end portion 15 of the cover 14 is fixed directly to the stem 10 while being held in contact with the stem 10 over the entire circumference of the stem 10. This restrains introduction of fuel or oil into the heat insulating space 21 via, for example, the surface of the stem 10. Accumulation of fuel or oil in the heat insulating space 21 and resulting deposit formation are thus restrained.

(9) Each rubber member 26 has an exposed portion 29, which is exposed from the cover 14. The exposed portions 29 are exposed to the intake air and thus cooled. This restrains a temperature rise in the rubber members 26, thus improving durability of the rubber members 26.

(10) The surface of the cover 14 and the surfaces of the exposed portions 29 are flush with one another. This decreases flow resistance of the intake air that passes the periphery of the intake valve and flows into a combustion chamber. Decrease of intake efficiency caused by the cover 14 is thus restrained.

(11) The surfaces of the exposed portions 29 and the valve seat contact surface 30 of the head 11 are flush with one another. This decreases the flow resistance of the intake air that passes the periphery of the intake valve and flows into a combustion chamber. The decrease of intake efficiency is thus further restrained.

(12) The surface of the cover 14, the surfaces of the exposed portions 29, and the valve seat contact surface 30 of the head 11 are flush with one another. The flow direction of the intake air flowing along the surface of the cover 14, the surfaces of the exposed portions 29, and then the valve seat contact surface 30 is thus not changed abruptly. This decreases the flow resistance of the intake air that passes the periphery of the intake valve and flows into a combustion chamber. The decrease of intake efficiency caused by the cover 14 is thus further restrained.

Fourth Embodiment

A poppet valve according to a fourth embodiment will now be described with reference to FIGS. 6 and 7. The fourth embodiment is different from the third embodiment in the configuration of a heat insulating member arranged at the lower end portion 16 of the cover 14. Like or the same reference numerals are given to those components that are like or the same as the corresponding components of the third embodiment and detailed explanations are omitted.

Figure 6A:
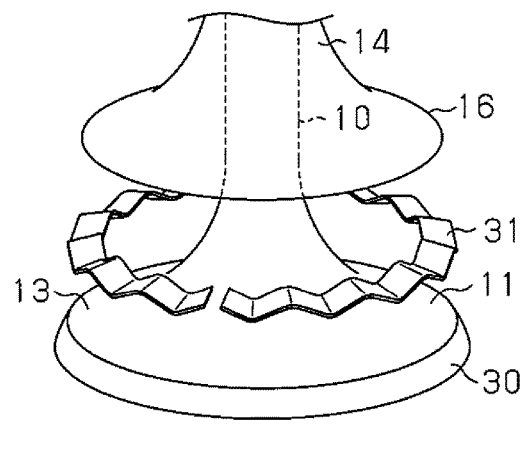
FIGS. 6A and 6B are perspective views showing a poppet valve.
Figure 6B:
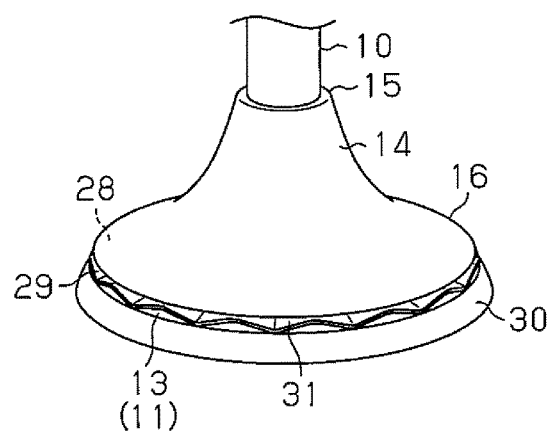

As shown in FIG. 6A, a heat insulating member 31 is arranged between the cover 14 and the head 11. The heat insulating member 31 is formed of a material that does not easily flex, such as ceramic or plastic, and has an annular shape extending in the circumferential direction of the stem 10. The cross section of the heat insulating member 31 extending in the circumferential direction of the stem 10 has a wavy shape. A part in the circumferential direction of the heat insulating member 31 is discontinuous. The heat insulating member 31 is attached to the valve body as will be described below, for example. That is, with reference to FIG. 6A, the heat insulating member 31 is arranged between the head 11 and the cover 14. Then, referring to FIG. 6B, the cover 14 is installed from above to press the heat insulating member 31 against the back 13 of the head 11. When pressed in the up-down direction of the wavy shape in this manner, the heat insulating member 31 is elastically deformed. With the heat insulating member 31 held in an elastically deformed state, the upper end portion 15 of the cover 14 is swaged to the stem 10 to fix the cover 14 and the stem 10 to each other. The heat insulating member 31 is thus clamped by the back surface of the lower end portion 16 of the cover 14 and the back 13 over the entire circumference.

Operation of the fourth embodiment will now be described.

A shape error is caused when a cover or a valve body is manufactured. Therefore, when the cover is attached to the valve body, the size of the gap between the cover and the head can vary in the circumferential direction. If the cover is fixed to the head through a heat insulating member formed of a material that does not easily flex, the gap with a varying size may not allow circumferential clamping of the insulating member by the head and the cover over the entire circumference, thus hampering stable fixation of the cover.

Figure 7A:
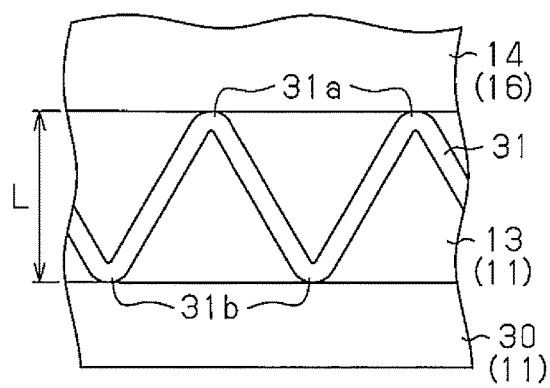
FIGS. 7A and 7B are enlarged views showing the head of a poppet valve.
Figure 7B:
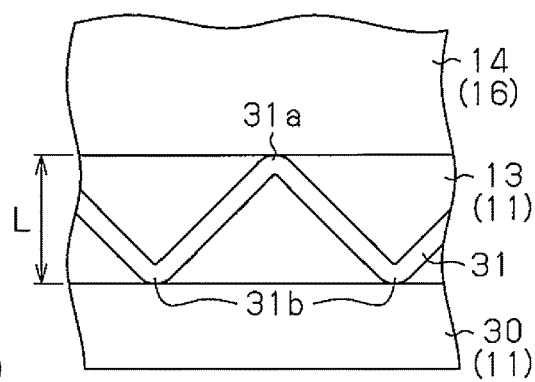

In the fourth embodiment, the circumferential cross section of the heat insulating member 31 has a wavy shape. The heat insulating member 31 is thus elastically deformed when being pressed in the up-down direction of the wavy shape. Therefore, even when the size L of the gap between the cover 14 and the head 11 varies due to a shape error of the cover 14 or the head 11 as illustrated in FIGS. 7A and 7B, the heat insulating member 31 is elastically deformed to absorb such variation of the size L. That is, referring to FIG. 7B, upper portions 31a and lower portions 31b of the heat insulating member 31 are brought into contact with the cover 14 and the head 11, respectively, over the entire circumference of the heat insulating member 31.

Further, the heat insulating member 31 has a discontinuous part in the circumferential direction. By enlarging the gap defined by the discontinuous part of the heat insulating member 31, the heat insulating member 31 is allowed to elastically deform by an increased amount.

The described above fourth embodiment achieves the following advantages in addition to the advantages (1) to (4) and (8).

(13) The heat insulating member 31 has an annular shape, and the circumferential cross section of the heat insulating member 31 has a wavy shape. The heat insulating member 31 is clamped by the back surface of the lower end portion 16 of the cover 14 and the back 13 in the up-down direction of the wavy shape. Therefore, when the cover 14 is attached to the head 11 via the heat insulating member 31, the heat insulating member 31 is elastically deformed to absorb a shape error of the cover 14 or the valve body. As a result, the cover 14 is stably attached to the valve body.

(14) The heat insulating member 31 has a discontinuous part in the circumferential direction and is thus elastically deformed by an increased amount. This ensures stable attachment of the cover 14 and the valve body even if the cover 14 or the valve body has a great shape error.

Fifth Embodiment

A poppet valve according to a fifth embodiment will now be described with reference to FIGS. 8 and 9. The fifth embodiment is different from the third embodiment in the configuration of a heat insulating member arranged at the lower end portion 16 of the cover 14. Like or the same reference numerals are given to those components that are like or the same as the corresponding components of the third embodiment and detailed explanations are omitted.

Figure 8:
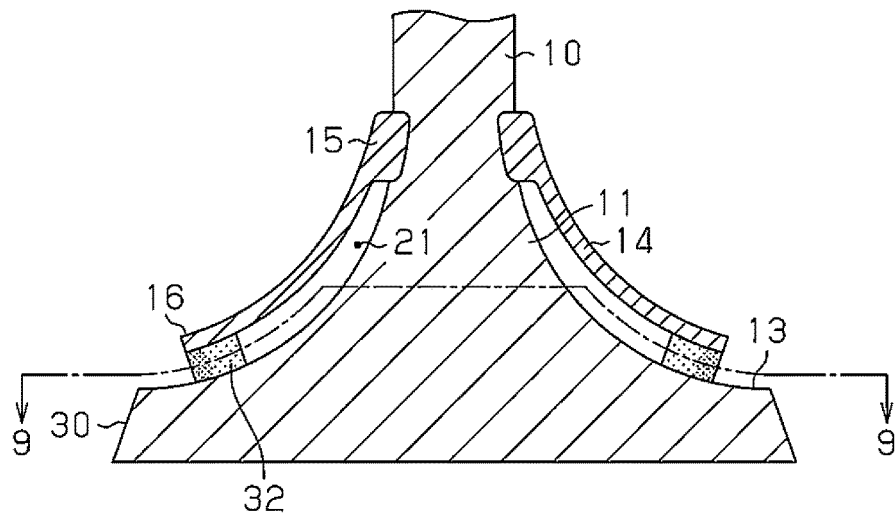
FIG. 8 is a cross-sectional view showing a poppet valve.
Figure 9:
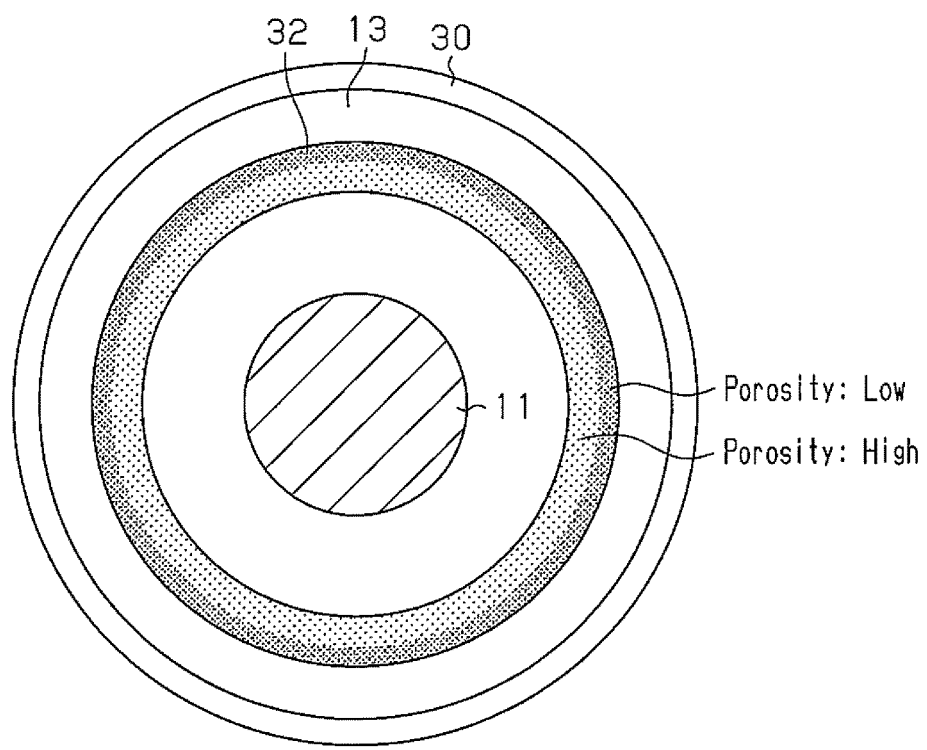
FIG. 9 is a cross-sectional view taken along line 9-9 of FIG. 8.

As shown in FIG. 8, a heat insulating member 32 is arranged between the lower end portion 16 of the cover 14 and the head 11 of the intake valve and extended over the entire circumference of the lower end portion 16 and the head 11. The heat insulating member 32 has an annular shape and is formed of porous metal. The porosity of an outer peripheral portion (an outer portion) of the heat insulating member 32 is lower than the porosity of an inner peripheral portion (an inner portion) of the heat insulating member 32, which is close to the heat insulating space 21.

Operation of the fifth embodiment will now be described.

When a heat insulating member is formed of porous metal, the porosity of the heat insulating member may be increased to improve heat insulating performance of the heat insulating member. However, the heat insulating member with the increased porosity promotes introduction of fuel or oil into the interior of the heat insulating member. If fuel or oil is introduced into the interior of the heat insulating member, pores become filled with the fuel or oil. This may decrease heat insulating performance of the heat insulating member.

However, in the fifth embodiment, the heat insulating member 32 is formed of porous metal and the porosity of the outer portion of the heat insulating member 32 is lower than the porosity of the inner portion of the heat insulating member 32, which is close to the heat insulating space 21. That is, the porosity of the outer portion to which fuel or oil adheres is set relatively low such that the outer portion is formed with comparatively high density. This hampers introduction of fuel or oil into the interior of the heat insulating member 32, thus restraining decrease of heat insulating performance caused by such introduction of the fuel or oil.

The described above fifth embodiment achieves the following advantage in addition to the advantages (1) to (4) and (8).

(15) The heat insulating member 32 is formed of porous metal and the porosity of the outer portion of the heat insulating member 32 is set lower than the porosity of the inner portion, which is close to the heat insulating space 21. This restrains decrease of heat insulating performance caused by introduction of fuel or oil into the interior of the heat insulating member 32.

Other Embodiments

The aforementioned embodiments may be modified as follows. Also, two or more of the following modifications may be combined as necessary.

Figure 10:
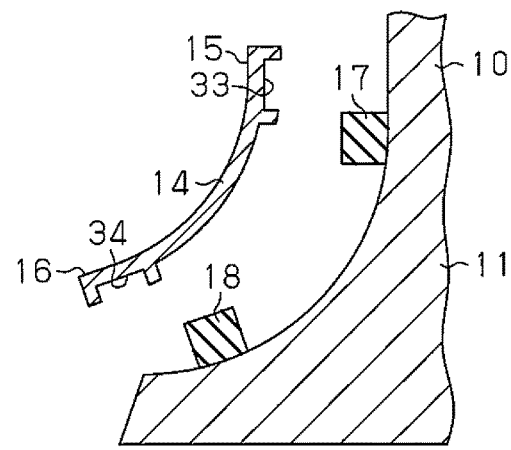
FIG. 10 is a cross-sectional view showing a poppet valve.
Figure 11:
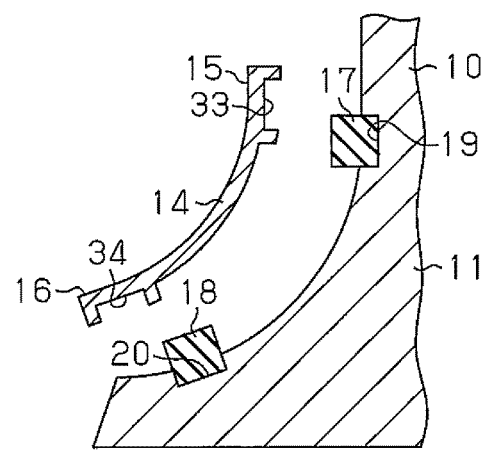
FIG. 11 is a cross-sectional view showing a poppet valve.

In the first embodiment, the rubber members 17, 18, which are protrusions, are fixed to the cover 14. The groove 19 and the recesses 20 are formed in the head 11. This configuration may be replaced by the configuration illustrated in FIG. 10. In the configuration, a circumferential groove 33 is formed in the inner peripheral surface of the upper end portion 15 of the cover 14 and extended over the entire circumference or partially in the circumferential direction. A plurality of recesses 34 are formed in the inner peripheral surface of the lower end portion 16 of the cover 14 and spaced apart at predetermined circumferential intervals. The rubber member 17 and the rubber members 18, which are fixed to the stem 10 and the head 11, respectively, through vulcanized bonding, for example, are engaged with the groove 33 and the recesses 34, respectively. Further, as illustrated in FIG. 11, the groove 33 and the recesses 34 are formed in the cover 14 and a groove 19 and a plurality of recesses 20 are formed in the intake valve. The rubber member 17 is engaged with the grooves 19, 33 and the rubber members 18 are engaged with the corresponding recesses 20, 34. In this manner, the cover 14 is attached to the head 11. The configurations shown in FIGS. 10 and 11 illustrate examples in which the support structures are modified in both the upper end portion 15 and the lower end portion 16 of the cover 14. However, the above-described configurations may be employed in one of the upper end portion 15 and the lower end portion 16. Alternatively, in the second embodiment, the configurations illustrated in FIG. 10 or 11 may be used in the support structure of the upper end portion 15 of the cover 14. This configuration also achieves the same advantages as the above described advantages (1) to (7).

In the first embodiment, the rubber members 18 are arranged on the inner peripheral surface of the lower end portion 16 of the cover 14 and spaced apart at predetermined intervals in the circumferential direction of the lower end portion 16. Instead of this configuration, an annular rubber member extending over the entire circumference of the lower end portion 16 of the cover 14 may be arranged on the inner peripheral surface of the lower end portion 16. In this manner, the lower end portion of the heat insulating space 21 is sealed. In this case, it is preferable to replace the recesses 20 formed in the head 11 by, for example, a circumferential groove extending over the entire circumference and engage the annular rubber member with the groove. This configuration also achieves the same advantages as the above described advantages (1) to (3) and (5) to (7).

In the second embodiment, the rubber member 17 is fixed to the upper end portion 15 of the cover 14 and the groove 19, with which the rubber member 17 is engaged, is formed in the stem 10. However, the rubber member 17 may be fixed to the stem 10 and a circumferential groove may be formed in the inner peripheral surface of the upper end portion 15 of the cover 14 and extended either over the entire circumference or in a certain portion of the inner peripheral surface. The rubber member 17 is engaged with the groove.

In the second embodiment, the projecting portions 23 are arranged on the lower end portion 16 of the cover 14 and the recesses 24 are formed in the head 11. However, the projecting portions 23 may be formed on the head 11 and the recesses with which the projecting portions 23 are engaged may be formed in the cover 14. In this case, it is preferable to coat the inner peripheral surfaces of the recesses formed in the lower end portion 16 of the cover 14 with the thermal barrier coatings 25. This configuration also achieves the same advantages as the above described advantages (1) to (7).

In the second embodiment, the projecting portions 23 are arranged on the lower end portion 16 of the cover 14 and spaced apart at predetermined intervals in the circumferential direction of the lower end portion 16. However, an annular projecting portion extending over the entire circumference of the inner peripheral surface of the lower end portion 16 of the cover 14 may be arranged on the inner peripheral surface of the lower end portion 16. In this case, it is preferable to replace the recesses 24 formed in the head 11 by, for example, a circumferential groove extending over the entire circumference and engage the annular projecting portion with the groove. It is also preferable to coat the inner peripheral surface of the groove with an annular thermal barrier coating. This configuration also achieves the same advantages as the above described advantages (1) to (3) and (5) to (7).

Figure 12:
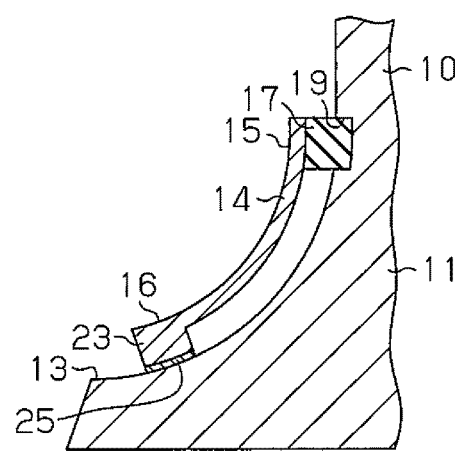
FIG. 12 is a cross-sectional view showing a poppet valve.

The second embodiment may be modified as illustrated in, for example, FIG. 12. Same or like reference numerals are given to components of FIG. 12 that are the same as or like corresponding components of the second embodiment and detailed description of these components is omitted herein.

As shown in FIG. 12, the cover 14 of the intake valve has a plurality of projecting portions 23, which are formed on the lower end portion 16 of the cover 14. Portions of the back 13 of the head 11 facing the projecting portions 23 are each coated with the thermal barrier coating 25. Each of the thermal barrier coatings 25 and the associated one of the projecting portions 23 are bonded together using, for example, adhesive.

This configuration also achieves the same advantages as the above described advantages (1) to (4).

In the configuration, instead of forming the annular groove 19 in the stem 10, the portion of the stem 10 facing the upper end portion 15 of the cover 14 may be coated with an annular thermal barrier coating and the thermal barrier coating may be bonded with the inner peripheral surface of the upper end portion 15 of the cover 14.

In the first and second embodiments, the rubber members 17, 18 are each used as a heat insulating member having lower heat conductivity than that of the head 11. However, any other suitable heat insulating member formed of ceramic or plastic or the like may be employed. This configuration also achieves the same advantages as the above described advantages (1) to (6).

Figure 13:
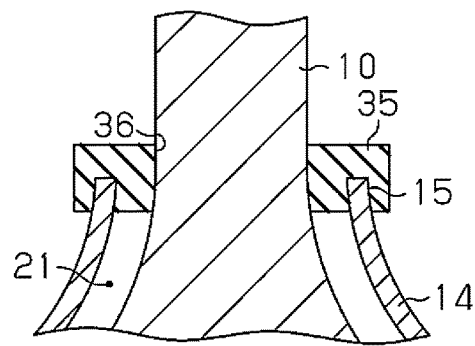
FIG. 13 is an enlarged cross-sectional view showing an upper end portion of a cover.

In the first and second embodiments, the rubber member 17 is arranged on the inner peripheral surface of the upper end portion 15 of the cover 14. However, as long as the upper end of the heat insulating space 21 is sealed, this configuration may be modified as illustrated in, for example, FIGS. 13 to 15. FIGS. 13 to 15 are each an enlarged cross-sectional view of the upper end portion 15 of the cover 14. In FIGS. 13 to 15, like or the same reference numerals are given to those components that are like or the same as the corresponding components of the above-mentioned embodiments and detailed explanations are omitted.

In the example illustrated in FIG. 13, a ring-like rubber member 35 is fixed to the upper end portion 15 of the cover 14 to cover the distal end of the cover 14. The inner diameter of the rubber member 35 is slightly smaller than the outer diameter of the stem 10. Therefore, when the stem 10 is inserted through a hole 36 defined by the ring-like rubber member 35, the inner peripheral surface of the rubber member 35 and the stem 10 are brought into tight contact with each other via an elastic action of the rubber member 35.

Figure 14A:
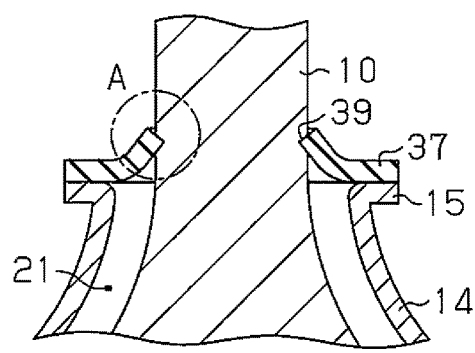
FIGS. 14A and 14B are enlarged cross-sectional views showing an upper end portion of a cover.
Figure 14B:
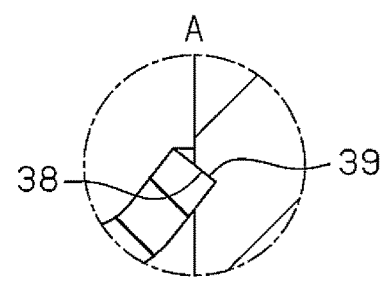
Figure 15:
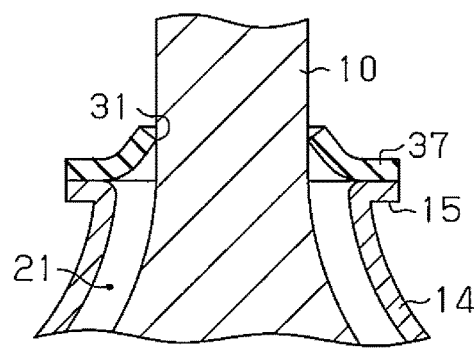
FIG. 15 is an enlarged cross-sectional view showing an upper end portion of a cover.

In the example illustrated in FIGS. 14A and 14B, the upper end portion 15 of the cover 14 is angled in a direction separating from the stem 10 (in a radially outward direction). A ring-like rubber member 37 is fixed to the top surface of the upper end portion 15. The inner diameter of the rubber member 37 is smaller than the outer diameter of the stem 10. Referring to FIG. 14B, the stem 10 has a groove 38, which extends over the entire circumference of the stem 10. When the stem 10 is inserted through a hole 39 defined by the ring-like rubber member 37, an inner peripheral side of the rubber member 37 is elastically deformed and thus an inner peripheral end portion of the rubber member 37 is engaged with the groove 38 of the stem 10. As a result, the cover 14 is attached to the stem 10 with the upper end of the heat insulating space 21 sealed.

Also, as shown in FIG. 15, the groove 38 of the stem 10 may be omitted from this configuration. That is, the rubber member 37 and the stem 10 may be held in tight contact with each other using reactive force produced through elastic deformation of the rubber member 37.

This configuration seals the upper end of the heat insulating space 21 by means of the rubber members 35, 37, thus achieving the same advantages as the advantages (1) to (5).

Figure 16:
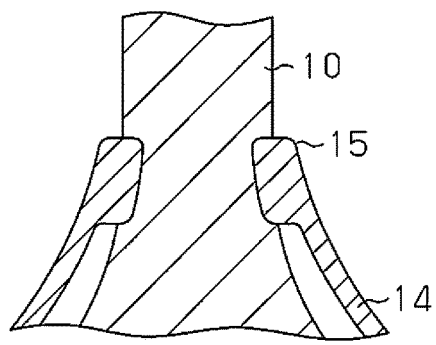
FIG. 16 is an enlarged cross-sectional view showing an upper end portion of a cover.

In the first and second embodiments, the upper end portion 15 of the cover 14 is supported by the stem 10 through the rubber member 17. However, if the stem 10 is heated only to a limited extent, the upper end portion 15 of the cover 14 may be fixed directly to the stem 10 over the entire circumference of the stem 10, as illustrated in FIG. 16. In this case, the upper end portion 15 of the cover 14 may be either swaged or welded and thus fixed to the stem 10. Also in this configuration, the cover 14 is supported by the head 11, which is heated in the intake valve, via the rubber members 18 and the thermal barrier coatings 25. This achieves the same advantages as the advantages (1) to (5).

In the first and second embodiments, the annular rubber member 17, which extends over the entire circumference of the inner peripheral surface of the upper end portion 15 of the cover 14, is arranged on the inner peripheral surface of the upper end portion 15. However, a plurality of rubber members may be arranged on the upper end portion 15 of the cover 14 and spaced apart in the circumferential direction of the upper end portion 15. This configuration also achieves the same advantages as the above described advantages (1) to (4).

In the first and second embodiments, the support portions for supporting the cover 14 on the valve body (the stem 10 and the head 11) via the corresponding rubber members are arranged in the opposite end portions 15, 16 of the cover 14. However, the support portions may be arranged in any suitable portion other than the upper and lower end portions 15, 16 of the cover 14. This configuration also achieves the same advantages as the above described advantages (1) and (2).

The third embodiment may be modified as illustrated in, for example, FIGS. 17 to 21. FIGS. 17 to 21 are enlarged cross-sectional views showing the lower end portion 16 of the cover 14. Same or like reference numerals are given to components of FIGS. 17 to 21 that are the same as or like corresponding components of the third embodiment and detailed description of these components is omitted herein.

Figure 17:
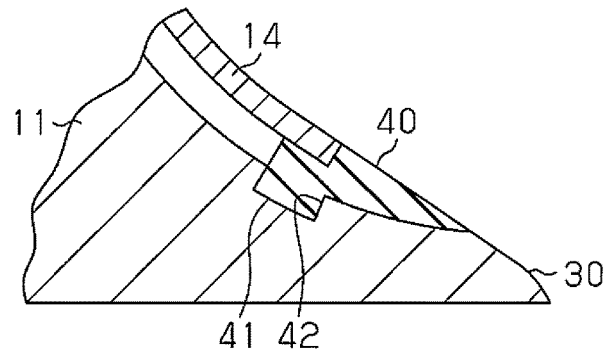
FIG. 17 is an enlarged cross-sectional view showing a lower end portion of a cover.

In the example shown in FIG. 17, a protrusion 41, which protrudes toward the head 11, is formed on a rubber member 40 for supporting the cover 14. A recess 42, with which the protrusion 41 is engaged, is formed in the head 11. By engaging the protrusion 41 with the recess 42, the rubber member 40 is fixed to the head 11.

This configuration further facilitates attachment of the rubber member 40 and the head 11. Also, even when a protrusion protruding toward the rubber member 40 is formed on the head 11 and a recess with which the protrusion is engaged is formed in the rubber member 40, the same advantage is achieved.

Figure 18:
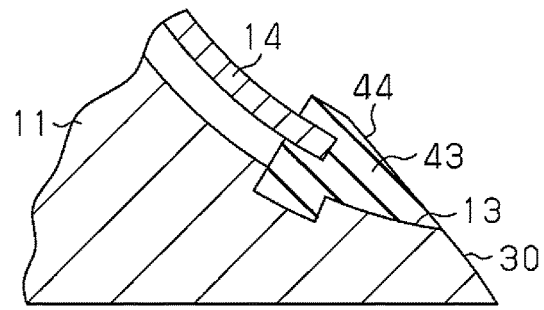
FIG. 18 is an enlarged cross-sectional view showing a lower end portion of a cover.

In the example illustrated in FIG. 18, although the cover 14 is supported by the back 13 via a rubber member 43 as in the third embodiment, the surface of an exposed portion 44 of the rubber member 43 and the surface of the cover 14 are not flush with each other. This configuration also achieves the same advantages as the above described advantages (1) to (4), (7) to (9), and (11).

Figure 19:
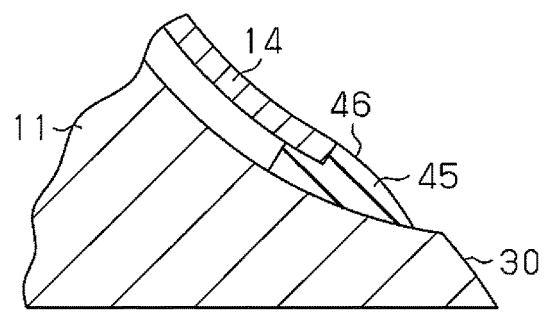
FIG. 19 is an enlarged cross-sectional view showing a lower end portion of a cover.

In the example shown in FIG. 19, the surface of an exposed portion 46 of a rubber member 45 is not flush with the valve seat contact surface 30 of the head 11. This configuration also achieves the same advantages as the above described advantages (1) to (4) and (7) to (10).

Figure 20:
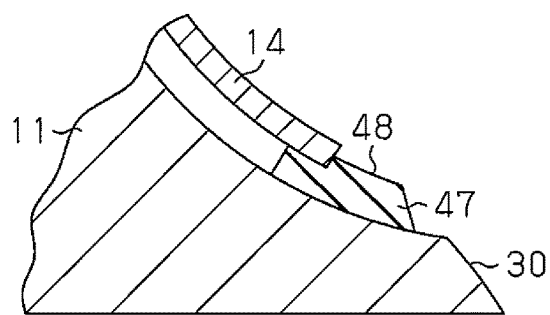
FIG. 20 is an enlarged cross-sectional view showing a lower end portion of a cover.
Figure 21:
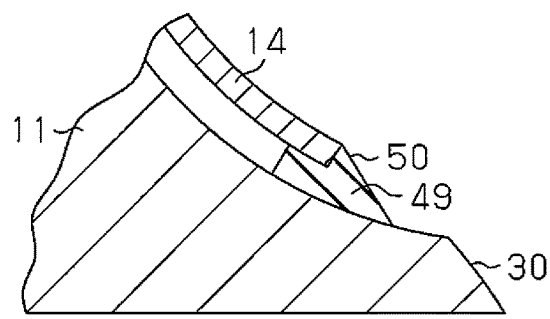
FIG. 21 is an enlarged cross-sectional view showing a lower end portion of a cover.

Alternatively, as illustrated in FIGS. 20 and 21, surfaces of exposed portions 48, 50 of rubber members 47, 49, the surface of the cover 14, and the valve seat contact surface 30 of the head 11 do not necessarily have to be flush with one another. This configuration also achieves the same advantages as the above described advantages (1) to (4) and (7) to (9).

In the examples illustrated in FIGS. 17 to 21, similar configurations may be accomplished by employing any other suitable heat insulating members formed of ceramic or plastic or the like instead of the rubber members 40, 43, 45, 47, 49 serving as the heat insulating members.

In the third embodiment, the rubber members 26 are arranged on the back 13 of the head 11 and spaced apart at predetermined intervals in the circumferential direction of the back 13. However, an annular rubber member may be extended over the entire circumference of the head 11 to seal the lower end portion of the heat insulating space 21. This configuration also achieves the same advantages as the above described advantages (1) to (3) and (7) to (11).

In the third embodiment, the cover 14 is fixed directly to the stem 10 by swaging the upper end portion 15 of the cover 14 to the stem 10. However, the cover 14 may be fixed directly to the stem 10 using any other suitable method such as welding.

Figure 22:
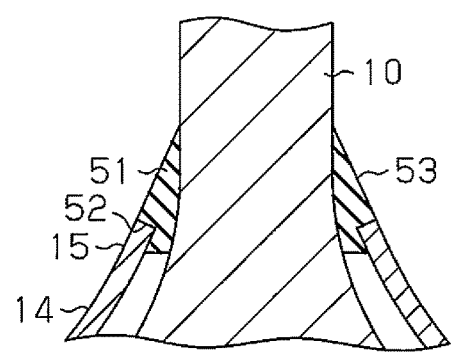
FIG. 22 is an enlarged cross-sectional view showing an upper end portion of a cover.

Although the upper end portion 15 of the cover 14 is fixed directly to the stem 10 in the third embodiment, this configuration may be modified as illustrated in, for example, FIG. 22.

In the example illustrated in FIG. 22, the upper end portion 15 of the cover 14 is fixed to the stem 10 via an annular rubber member 51. The rubber member 51 has a stepped portion 52 and the upper end portion 15 of the cover 14 is fixed to the stepped portion 52. The height of the stepped portion 52 is substantially equal to the thickness of the cover 14. When the rubber member 51 and the cover 14 are fixed to each other, the surface of an exposed portion 53 of the rubber member 51 and the surface of the cover 14 are flush with each other.

This configuration restrains separation of the intake air flowing along the stem 10 of the intake valve from the connecting portion between the surface of the exposed portion 53 and the surface of the cover 14, thus further restraining decrease of intake efficiency. In the example shown in FIG. 22, the rubber member 51 may be replaced by a heat insulating member formed of ceramic or plastic or the like.

In the third embodiment, the upper end portion 15 of the cover 14 is fixed to the stem 10 while being held in contact with the stem 10 over the entire circumference in the circumferential direction of the stem 10. However, the upper end portion 15 of the cover 14 may be fixed to the stem 10 while being held in contact with the stem 10 at a plurality of positions spaced apart in the circumferential direction of the stem 10.

In the fourth embodiment, the heat insulating member 31 has an annular shape and the circumferential cross section of the heat insulating member 31 has a wavy shape such that elasticity of the heat insulating member 31 is ensured. However, to ensure such elasticity, heat insulating members having shapes illustrated in, for example, FIGS. 23 and 24 may be employed. Same or like reference numerals are given to components of FIGS. 23 and 24 that are the same as or like corresponding components of the fourth embodiment and detailed description of these components is omitted herein.

Figure 23:
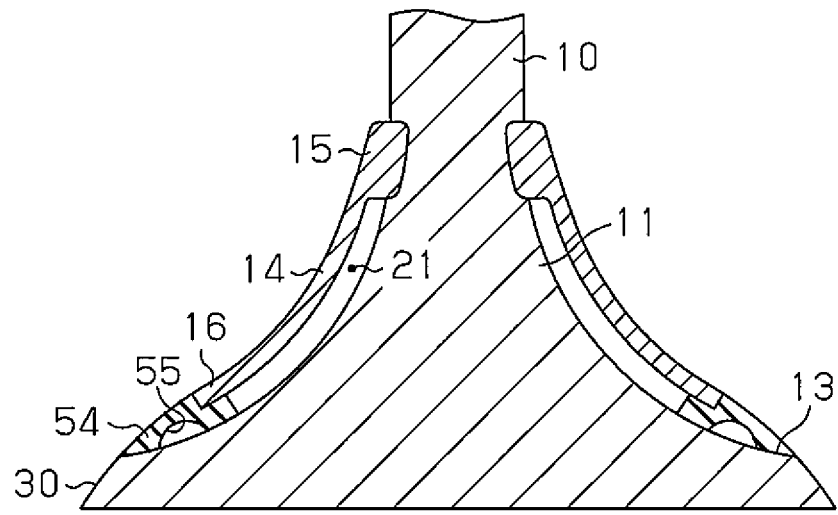
FIG. 23 is a cross-sectional view showing a poppet valve.

As illustrated in FIG. 23, a heat insulating member 54 is clamped between the lower end portion 16 of the cover 14 and the head 11. The heat insulating member 54 is formed of a material that does not easily flex such as ceramic or plastic and has an annular shape extending in the circumferential direction of the head 11. The surface of the heat insulating member 54 facing the head 11 has a dent 55. The head 11, the heat insulating member 54, and the cover 14 are attached together in the same manner as that of the fourth embodiment.

In this configuration, when the cover 14 presses the heat insulating member 54 against the back 13, the dent 55 of the heat insulating member 54 elastically deforms the heat insulating member 54 to absorb a shape error of the head 11 or the cover 14. This configuration thus achieves the same advantages as the advantages of the fourth embodiment, which has been described above.

Figure 24:
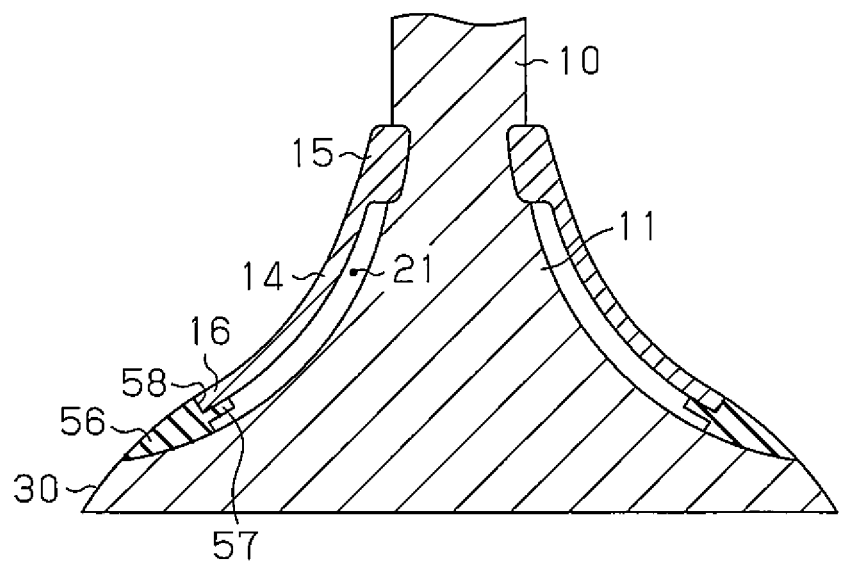
FIG. 24 is a cross-sectional view showing a poppet valve.

Referring to FIG. 24, a heat insulating member 56 has an annular shape extending in the circumferential direction of the head 11 and includes a protrusion 57, which protrudes toward the heat insulating space 21. The protrusion 57 forms a stepped portion 58 in the heat insulating member 56. The cover 14 is fixed to the stepped portion 58. The heat insulating member 56 is formed of a material that does not easily flex such as ceramic or plastic. The head 11, the heat insulating member 56, and the cover 14 are attached together in the same manner as that of the fourth embodiment.

In this configuration, when the cover 14 is attached to the head 11 through the heat insulating member 56, the protrusion 57 is elastically deformed to absorb a shape error of the cover 14 or the head 11. This configuration also achieves the same advantages as those of the fourth embodiment.

In the examples illustrated in FIGS. 23 and 24, the heat insulating members 54, 56 each have an annular shape and are arranged over the entire circumference of the head 11. However, a plurality of heat insulating members may be arranged in a state spaced apart at predetermined circumferential intervals. In this case, it is preferable to fix the heat insulating members to one of the head 11 and the cover 14 in advance and then attach the other one of the head 11 and the cover 14 to the aforementioned one of the head 11 and the cover 14.

In the fourth embodiment, the upper end portion 15 of the cover 14 is fixed to the stem 10 while being held in contact with the stem 10 over the entire circumference of the stem 10. However, the upper end portion 15 of the cover 14 may be fixed to the stem 10 while being held in contact with the stem 10 at a plurality of positions that are spaced apart in the circumferential direction of the stem 10.

Although porous metal is used as the porous material in the fifth embodiment, any other suitable material such as ceramic or plastic may be employed as long as the material is porous.

In each of the illustrated embodiments, the back 13 of the head 11 and the stem 10 are covered by the cover 14 with the heat insulating space 21 located between the back 13 and the stem 10. However, only the stem 10 may be covered by a cover. Also in this case, by supporting the cover via a member having lower heat conductivity than that of the stem, the amount of the heat transferred from the valve body to the cover is decreased. This effectively restrains a temperature rise in the cover. As a result, vaporization of volatile elements of fuel or oil adhering to the surface of the cover is restrained and the amount of deposit accumulated on the cover is decreased.

In each of the illustrated embodiments, deposit accumulation on the cover 14 is further restrained by applying a deposit restraining agent on the surface of the cover 14. In this case, a temperature rise in the cover 14 is restrained such that thermal load on the deposit restraining agent is decreased. This improves durability of the deposit restraining agent.

The configurations of the illustrated embodiments and modified examples may be used in an exhaust valve except for the configuration in which a portion of the heat insulating member is exposed from the cover to cool the heat insulating member by means of intake air.

DESCRIPTION OF THE REFERENCE NUMERALS

10 . . . stem, 11 . . . head, 12 . . . head surface, 13 . . . back, 14 . . . cover, 15 . . . upper end portion, 16 . . . lower end portion, 17, 18, 26, 35, 37, 40, 43, 45, 47, 49, 51 . . . rubber member, 19, 33 . . . groove, 20, 24, 34 . . . recess, 21 . . . heat insulating space, 22 . . . gap, 23 . . . projecting portion, 25 . . . thermal barrier coating, 27, 52, 58 . . . stepped portion, 28 . . . covered portion, 29, 44, 46, 48, 50, 53 . . . exposed portion, 30 . . . valve seat contact surface, 31, 32, 54, 56 . . . heat insulating member, 31a . . . upper portion, 31b . . . lower portion, 36, 39 . . . hole, 38 . . . groove, 41 . . . protrusion, 42 . . . recess, 55 . . . dent, 57 . . . protrusion.

The invention claimed is:

1. A poppet valve comprising:
a valve body having a basal end and a distal end, wherein the valve body includes a head arranged at the distal end and having a back and a stem extending from the head toward the basal end;
a cover adapted for covering at least a portion of a range including the back and the stem with a heat insulating space in between, wherein the cover includes a first end portion and a second end portion, wherein the first end portion is closer to the distal end as compared to the second end portion, and the second end portion is closer to the basal end as compared to the first end portion; and
a support portion arranged between the cover and the valve body, wherein the support portion supports the cover via a heat insulating member having a heat conductivity lower than a heat conductivity of the valve body,
wherein the support portion includes a first support portion arranged at the first end portion of the cover, and a second support portion arranged at the second end portion of the cover.

2. The poppet valve according to claim 1, wherein the heat insulating member is formed of a material different from a material of the cover.

3. The poppet valve according to claim 1, wherein the first support portion is one of a plurality of first support portions and, the first support portions are spaced apart in a circumferential direction of the head.

4. The poppet valve according to claim 1, wherein the second support portion is arranged over the entire circumference of the head or the stem.

5. The poppet valve according to claim 1, wherein
the support portion includes a protrusion that protrudes either from one of the head and the stem to the cover or from the cover to one of the head and the stem,
the support portion also includes a recess that is formed either in one of the head and the stem or in the cover in which the protrusion is not formed, and
the protrusion and the recess are engaged with each other.

6. A poppet valve comprising:
a valve body having a basal end and a distal end, wherein the valve body includes a head arranged at the distal end and having a back and a stem extending from the head toward the basal end;
a cover adapted for covering at least a portion of a range including the back and the stem with a heat insulating space in between; and
a support portion arranged between the cover and the valve body, wherein the support portion supports the cover via a heat insulating member having a heat conductivity lower than a heat conductivity of the valve body, wherein
the poppet valve is configured to function as an intake valve, and
the heat insulating member includes a covered portion covered by the cover and an exposed portion exposed from the cover.

7. The poppet valve according to claim 6, wherein a surface of the cover and a surface of the exposed surface are flush with each other.

8. The poppet valve according to claim 6, wherein
the support portion is located at the end portion of the cover comparatively closer to the distal end as compared to the basal end, and
a surface of the exposed portion and a valve seat contact surface of the head are flush with each other.

9. A poppet valve comprising:
a valve body having a basal end and a distal end, wherein the valve body includes a head arranged at the distal end and having a back and a stem extending from the head toward the basal end;
a cover adapted for covering at least a portion of a range including the back and the stem with a heat insulating space in between; and
a support portion arranged between the cover and the valve body, wherein the support portion supports the cover via a heat insulating member having a heat conductivity lower than a heat conductivity of the valve body,
wherein the heat insulating member is formed of an elastic material.

10. A poppet valve comprising:
a valve body having a basal end and a distal end, wherein the valve body includes a head arranged at the distal end and having a back and a stem extending from the head toward the basal end;
a cover adapted for covering at least a portion of a range including the back and the stem with a heat insulating space in between; and
a support portion arranged between the cover and the valve body, wherein the support portion supports the cover via a heat insulating member having a heat conductivity lower than a heat conductivity of the valve body,
wherein the heat insulating member has an elastically deformable shape.

11. A poppet valve comprising:
a valve body having a basal end and a distal end, wherein the valve body includes a head arranged at the distal end and having a back and a stem extending from the head toward the basal end;
a cover adapted for covering at least a portion of a range including the back and the stem with a heat insulating space in between; and
a support portion arranged between the cover and the valve body, wherein the support portion supports the cover via a heat insulating member having a heat conductivity lower than a heat conductivity of the valve body, wherein
the heat insulating member has an annular shape extending in a circumferential direction of the stem,
a cross section of the heat insulating member in the circumferential direction has a wavy shape, and
the heat insulating member is clamped by an end portion of the cover and the back, wherein the end portion of the cover is comparatively closer to the distal end as compared to the basal end.

12. The poppet valve according to claim 11, wherein a part of the heat insulating member is discontinuous in the circumferential direction.

13. A poppet valve comprising:
a valve body having a basal end and a distal end, wherein the valve body includes a head arranged at the distal end and having a back and a stem extending from the head toward the basal end;
a cover adapted for covering at least a portion of a range including the back and the stem with a heat insulating space in between; and
a support portion arranged between the cover and the valve body, wherein the support portion supports the cover via a heat insulating member having a heat conductivity lower than a heat conductivity of the valve body, wherein
the heat insulating member is formed of a porous material,
the heat insulating member has an inner portion close to the heat insulating space and an outer portion located on a side opposite to the inner portion, and
the outer portion has a porosity lower than the porosity of the inner portion.

\* \* \* \* \*